(12) United States Patent
Thompson

(10) Patent No.: US 11,092,243 B2
(45) Date of Patent: Aug. 17, 2021

(54) SANITARY CLEAN-IN-PLACE BUTTERFLY VALVE WITH LOW ACTUATION FORCE

(71) Applicant: Inovance, Inc., Pleasant Prairie, WI (US)

(72) Inventor: Donovan S. Thompson, Racine, WI (US)

(73) Assignee: Inovance, Inc., Pleasant Prairie, WI (US)

( * ) Notice: Subject to any disclaimer, the term of this patent is extended or adjusted under 35 U.S.C. 154(b) by 0 days.

(21) Appl. No.: 16/519,598

(22) Filed: Jul. 23, 2019

(65) Prior Publication Data

US 2021/0025499 A1   Jan. 28, 2021

(51) Int. Cl.
*F16K 1/226* (2006.01)
*F16K 27/02* (2006.01)

(52) U.S. Cl.
CPC ........ *F16K 1/2265* (2013.01); *F16K 27/0218* (2013.01)

(58) Field of Classification Search
CPC ... F16K 1/2265; F16K 27/0218; F16K 1/2263
USPC .................................................. 251/306–307
See application file for complete search history.

(56) References Cited

U.S. PATENT DOCUMENTS

| | | | |
|---|---|---|---|
| 2,923,524 A * | 2/1960 | Fawkes | F16K 1/2263 251/306 |
| 2,994,342 A | 8/1961 | Stillwagon | |
| 3,048,363 A * | 8/1962 | Garrigan | F16K 1/2263 251/307 |
| 3,072,139 A | 1/1963 | Mosites | |
| 3,118,465 A * | 1/1964 | Scaramucci | F16K 1/2265 137/454.2 |
| 3,173,650 A | 3/1965 | Cotterman et al. | |
| 3,306,573 A | 2/1967 | Trefil | |
| 3,341,170 A * | 9/1967 | Housworth | F16K 35/025 251/306 |

(Continued)

FOREIGN PATENT DOCUMENTS

| | | |
|---|---|---|
| EP | 292659 A2 | 11/1988 |
| GB | 2033054 A | 5/1980 |
| WO | 2012024195 A1 | 2/2012 |

*Primary Examiner* — John Bastianelli
(74) *Attorney, Agent, or Firm* — Jansson Munger; McKinley & Kirby Ltd.

(57) ABSTRACT

An improved butterfly valve having (a) a valve housing, (b) a valve-plate having a peripheral edge located in a central plane when in a fully-closed position, (c) a valve stem configured to rotate the valve-plate about an axis parallel to the central plane to control flow through the valve, and (d) a valve seat configured to engage the peripheral edge to form a seal when the valve-plate is in closed positions, the improvement wherein the valve seat comprises (1) a resilient sealing member having an inward valve-seating surface engaging the peripheral edge therearound and an opposite outward surface; and (2) a ring structure: (i) having an inner surface adjacent to the outward surface; (ii) having the valve stem passing therethrough along the axis; (iii) divided into two sub-ring portions adjacent to each other with valve-stem-adjacent ends; and (iv) sized to permit central-plane-parallel relative sub-ring-portion displacement perpendicular to the axis, thereby lowering valve actuation force.

13 Claims, 11 Drawing Sheets

(56) References Cited

U.S. PATENT DOCUMENTS

| | | | | |
|---|---|---|---|---|
| 3,376,014 A | * | 4/1968 | Bucklet | F16K 1/2265 251/306 |
| 3,473,784 A | * | 10/1969 | Radford | F16K 1/2265 251/306 |
| 3,540,691 A | * | 11/1970 | Snell, Jr. | F16K 1/2265 251/151 |
| 3,565,395 A | * | 2/1971 | Hansen | F16K 27/0218 251/306 |
| 3,596,876 A | * | 8/1971 | Scaramucci | F16K 1/2263 251/306 |
| 3,612,483 A | | 10/1971 | Pool | |
| 3,633,872 A | | 1/1972 | Wright | |
| 3,661,171 A | | 5/1972 | Smith et al. | |
| 3,727,883 A | | 4/1973 | Conners et al. | |
| 3,779,511 A | | 12/1973 | Wenglar | |
| 4,006,882 A | | 2/1977 | Bonafous | |
| 4,176,675 A | | 12/1979 | Liberman | |
| 4,223,430 A | * | 9/1980 | Sherlaw | F16K 1/2265 251/306 |
| 4,822,001 A | | 4/1989 | Sisk | |
| 5,388,807 A | * | 2/1995 | Habicht | F16K 1/2263 251/305 |
| 6,202,981 B1 | | 3/2001 | Davis et al. | |
| 7,448,593 B2 | * | 11/2008 | Lasse | F16K 1/2265 251/148 |
| 7,758,017 B2 | * | 7/2010 | Sisk | F16K 1/2265 251/306 |
| 7,946,556 B1 | | 5/2011 | Trott | |
| 8,172,202 B2 | | 5/2012 | Mendoza et al. | |
| 9,976,666 B1 | | 5/2018 | New | |
| 2009/0184476 A1 | | 7/2009 | Stefani et al. | |
| 2013/0032744 A1 | | 2/2013 | Duboy | |

* cited by examiner

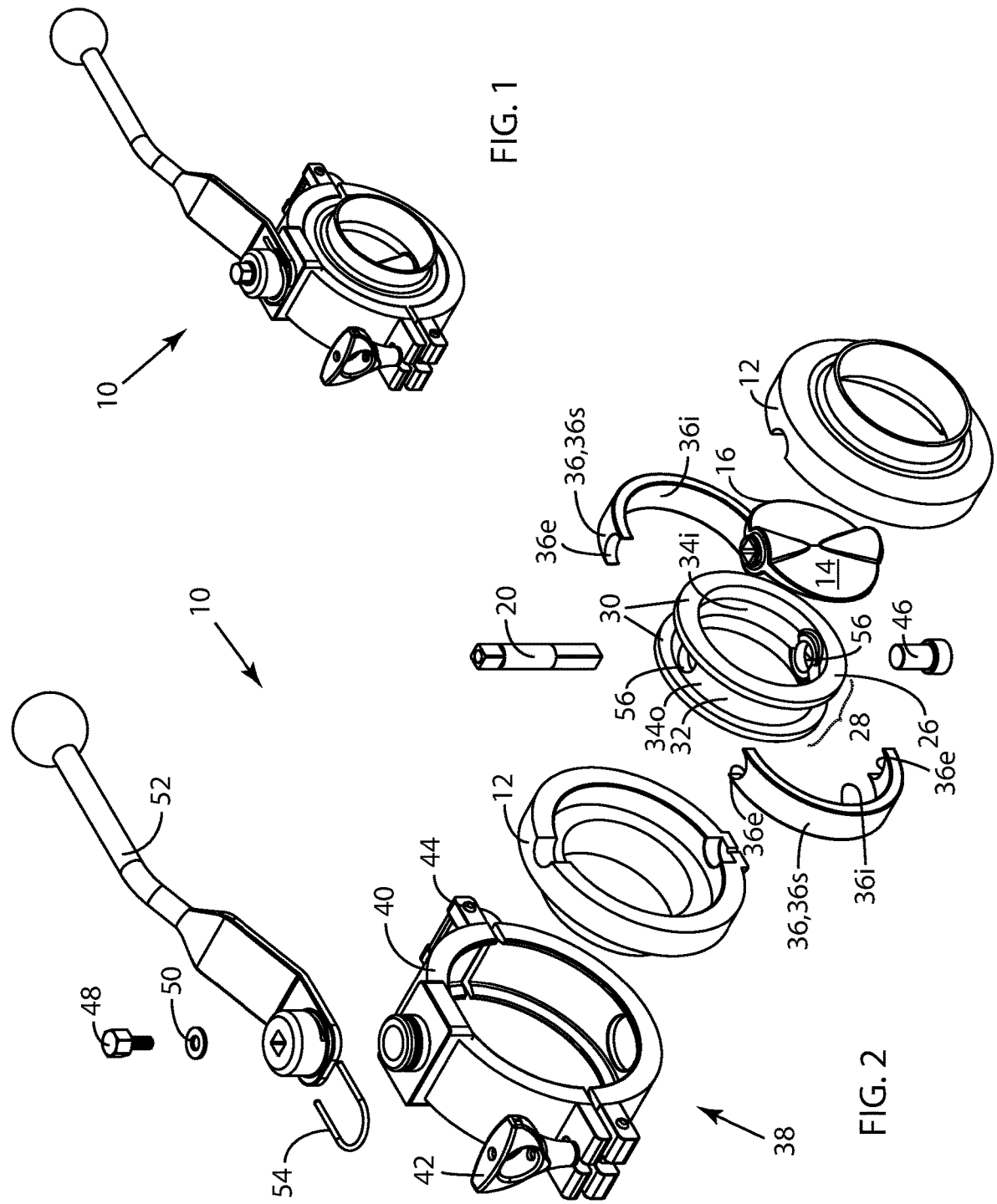

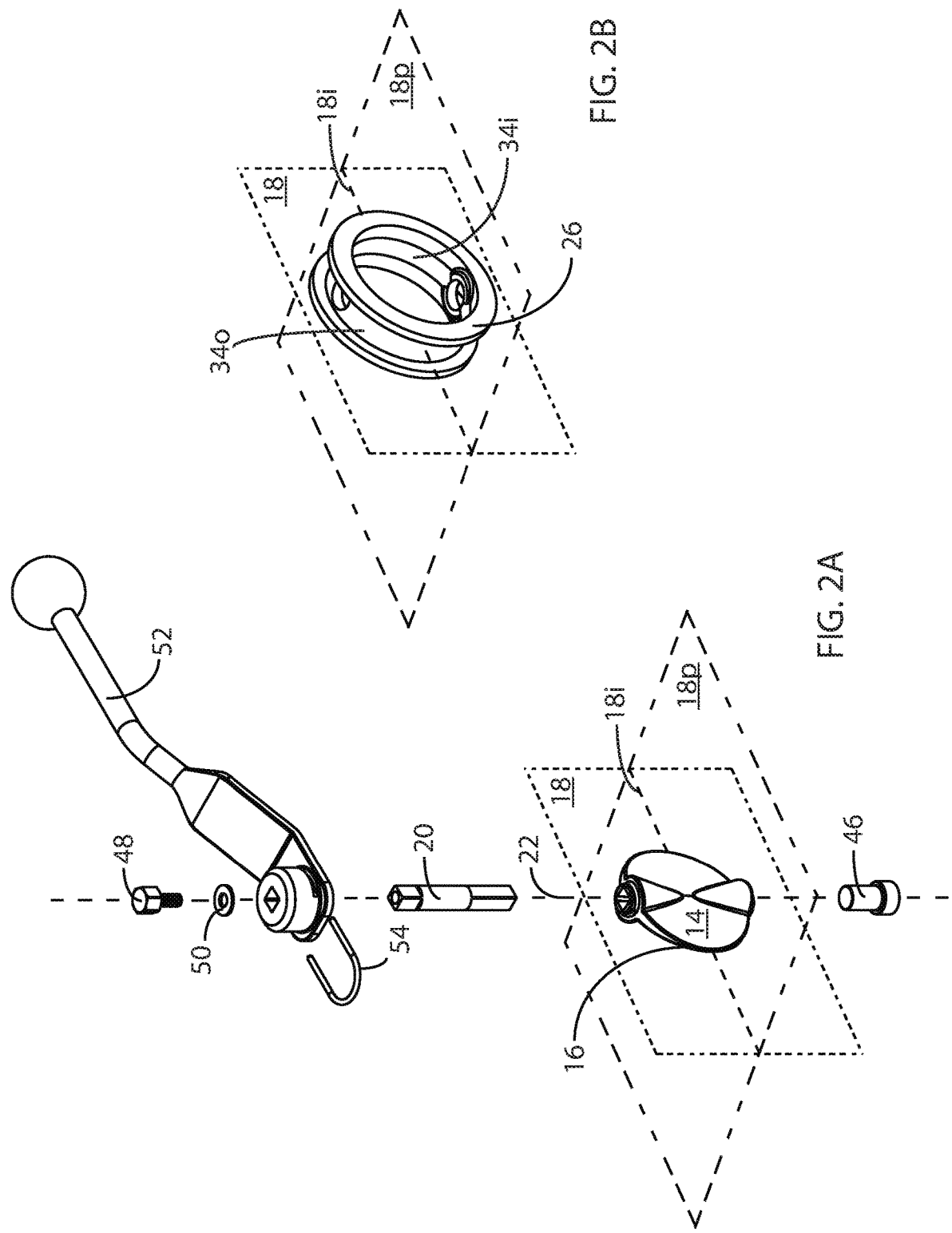

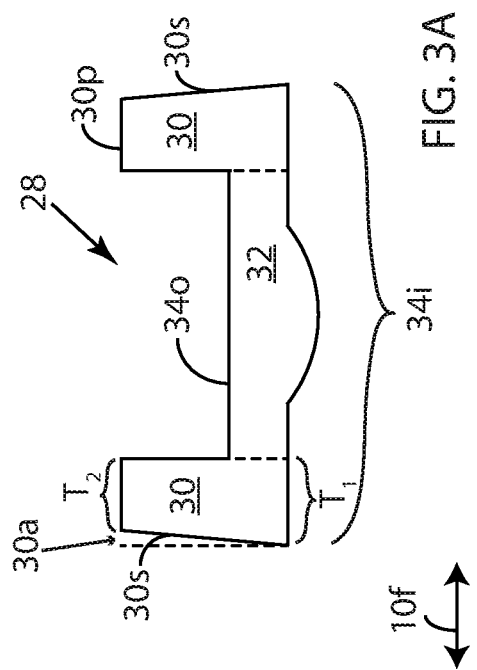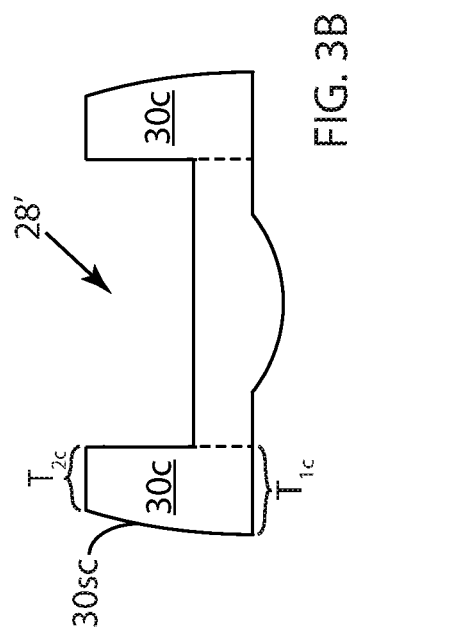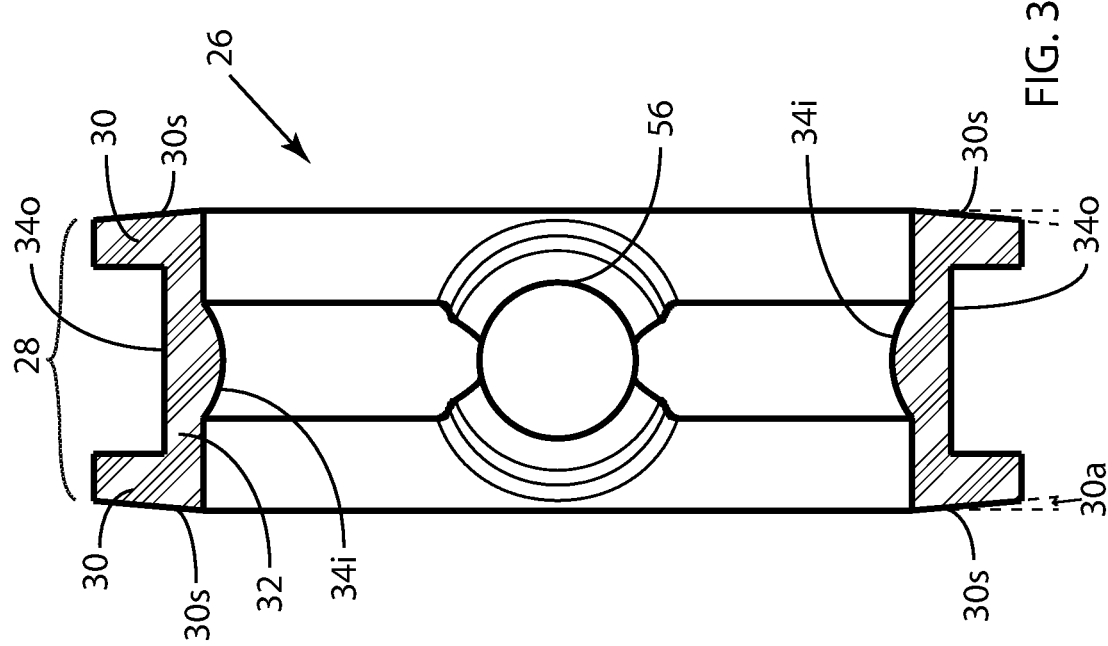

SANITARY CLEAN-IN-PLACE BUTTERFLY VALVE WITH LOW ACTUATION FORCE

FIELD OF THE INVENTION

This invention is related generally to the field of valves for sampling, shut-off and flow control, and more particularly to such valves which are used in applications involving high levels of sanitation.

BACKGROUND OF THE INVENTION

Disc valves, often called butterfly valves, are used in a wide variety of processes to provide flow control or shut-off at various points within a process system. Some of these applications, such as pharmaceutical and food processing, require extremely high levels of sanitation and sterilization. Many of the valves currently used are difficult to clean while they are installed in the system and thus have to be removed, disassembled, cleaned and then returned to the system in order to achieve and/or maintain the required levels of sanitation and sterilization. These cleaning steps consume a significant amount of time and reduce the overall system productivity which can be realized in such a system.

Current prior art disc valves rely primarily on the firmness of the material used for the valve seat in order to maintain the integrity of the sealing areas within the valve. Nevertheless, these valves must be disassembled and cleaned when applied in sanitary applications. Without disassembly for cleaning, it has been shown that the interfaces within the valve tend to trap product or debris while the valve is operated, and cleaning-in-place does not adequately remove product residue or debris from those interfaces.

Another issue with the current prior art disc valves is that such valves often require very high force levels to be actuated. Lowering actuation force while maintaining excellent sealing performance and ease of cleaning is beneficial for both manual and automatic actuation valve configurations. In addition, lowering the shear forces on the seals within a valve serves to prevent tearing of the seals.

One example of a prior art butterfly valve is found in U.S. Pat. No. 3,727,883 (Conners et al.). A second example of a prior art butterfly valve is disclosed in U.S. Pat. No. 2,994,342 (Stillwagon). Yet another example of a prior art butterfly valve is described in U.S. Pat. No. 3,661,171 (Smith et al.). Among these valves and the many other current valves, none has the force-lowering structure of the present invention.

The inventive valve described herein includes reinforcement structure within the valve seat to ensure tight sealing and support at the sealing interfaces while at the same time reducing the actuating force required for operation. Furthermore, flow product residue and debris entrapment is reduced or eliminated, and these improved valves have the ability to be cleaned-in-place. As a result, maintenance and production costs are significantly reduced, and process efficiency is increased.

OBJECTS OF THE INVENTION

It is an object of this invention to provide a butterfly valve which has structure which lowers actuation force while maintaining excellent sealing characteristics and preventing tearing of valve seals due to high shear forces on the seal material.

Another object of this invention to provide a butterfly valve which is able to be cleaned without removal from the system in which it is installed. Another object of this invention is to provide a butterfly valve which, nevertheless, is easily removed and reinstalled into the system in which it operates.

Another object of this invention is to provide a butterfly valve which eliminates the presence of any crevices or other regions internal to the valve into which debris such as fluid, particles, product residue or other contamination can be residually retained.

Another object of the inventive butterfly valve is to provide a valve which reduces production and maintenance costs and time for many types of sanitary processes.

These and other objects of the invention will be apparent from the following descriptions and from the drawings.

SUMMARY OF THE INVENTION

The present invention relates to a valve for sampling, shut-off and flow control in sanitary and hygienic applications in which lower actuation force is an advantageous feature. The invention is an improved butterfly valve having (a) a valve housing, (b) a valve-plate having a peripheral edge located in a central plane when in a fully-closed position, (c) a valve stem configured to rotate the valve-plate about an axis parallel to the central plane to control flow through the valve, and (d) a valve seat configured to engage the peripheral edge to form a seal when the valve-plate is in closed positions. The improvement to the valve seat comprises: (1) a resilient sealing member having an inward valve-seating surface engaging the peripheral edge therearound and an opposite outward surface; and (2) a ring structure, such ring structure: (i) having an inner surface adjacent to the outward surface; (ii) having the valve stem passing therethrough along the axis; (iii) divided into two sub-ring portions adjacent to each other with ends adjacent to the valve stem; and (iv) sized to permit relative sub-ring-portion displacement parallel to the central plane and perpendicular to the axis, thereby lowering valve actuation force.

In highly-preferred embodiments of the improved butterfly valve, the resilient sealing member has a U-shaped cross-section therearound formed from two lateral portions extending outwardly from a cross-portion therebetween that engages the peripheral edge, the sealing member being configured for sandwiching engagement by the housing. In some of these embodiments, the ring structure is within the U-shaped cross-section and configured to maintain the sandwiching engagement of the housing with the sealing member, thereby preventing accumulation of debris between the housing and sealing member.

In some preferred embodiments, the resilient sealing member is compressed in a direction substantially parallel with the direction of flow through the valve, and in some embodiments, the valve seat and valve housing are configured such that the sealing-member compression is greatest along each lateral portion at the inward valve-seating surface.

In some highly-preferred embodiments of the improved butterfly valve, the lateral portions of the resilient sealing member have an outer perimeter and a lateral-portion thickness, the outer-side surfaces angled such that the thickness decreases toward the outer perimeter. In some of these embodiments, the angle of the outer-side surfaces of the lateral portions with respect to the central plane is between 3 and 8 degrees, and in some of these embodiments, the outer-side surfaces of the lateral portions are curved surfaces.

In some embodiments, the resilient sealing member may be made of a material chosen from the group consisting of Kalrez®, buna, Viton® and EPDM.

In some embodiments, the resilient sealing member may be made of material having a Shore Type A durometer of between 50 and 90.

In some embodiments, the butterfly valve includes a handle and is manually actuated.

In some highly-preferred embodiments of the improved butterfly valve, the valve-plate is circular.

In another aspect of the inventive butterfly valve, the ring structure has sub-ring portions at least some of which are configured to permit the valve stem to pass through the ring structure.

The term "valve-plate" as used herein refers to structure within the improved butterfly valve of this invention which is actuated by a valve stem and the position of which determines the size of the flow opening within the valve. Often in butterfly valves, the valve-plate is circular or nearly-circular and is referred to as a valve disc. The term valve-plate is used herein to indicate that the present invention is not limited to circular or nearly-circular structures. Valve-plates may include structures having a wide range of shapes.

The term "ring structure" as used herein refers to the component of the valve which provides structural backing for the resilient sealing member. Such ring structure includes two or more sub-ring portions. In a fashion similar to the use of the term "valve-plate," the term "ring structure" (rather than simply a "ring") is used to indicate that such structure is not limited to having a circular or nearly-circular shape.

The term "fully-closed position" as used herein refers to the position of a valve disc such that its peripheral edge is located in a plane defined by the valve stem axis and points which are halfway between the lateral portions of the resilient sealing member.

The term "closed positions" as used herein includes both partially-closed and fully-closed positions of the improved butterfly valve. In partially-closed positions, only a portion of the peripheral edge may be engaging the resilient sealing member and forming a seal locally thereto.

BRIEF DESCRIPTION OF THE DRAWINGS

FIG. 1 is a perspective drawing of an embodiment of the sanitary clean-in-place butterfly valve of this invention.

FIG. 2 is an exploded perspective view of the inventive butterfly valve of FIG. 1.

FIG. 2A is an exploded perspective drawing of the valve-plate (valve disc), valve stem and disc hinge pin of the valve of FIG. 1, illustrating a valve disc axis in the central plane in which the valve-disc peripheral edge is located. (In the embodiment illustrated in FIGS. 1-7 and described in the detailed description herein, the valve-plate is circular and therefore is referred to as a valve disc. Other embodiments of the inventive butterfly valve disclosed herein may include non-circular valve-plates and other complementary parts of the valve.)

FIG. 2B is a perspective drawing of an embodiment of a circular valve-sealing member (resilient sealing member). FIG. 2B also illustrates the central plane, a plane perpendicular to the central plane, and the line of intersection between the two planes.

FIG. 3 is a cross-sectional view of the circular resilient sealing member of the inventive butterfly valve of FIG. 1.

FIG. 3A is a cross-sectional view of the resilient sealing member of FIG. 3 indicating the specific portions of the resilient sealing member as described herein.

FIG. 3B is a cross-sectional view of an alternative embodiment of a resilient sealing member, such embodiment having curved outer-side surfaces of the lateral portions of the sealing member.

FIG. 6A shows the valve disc in the fully-closed position.

FIG. 6B shows the valve disc in a closed position, with the valve disc away from the fully-closed position but nevertheless contacting the sealing member of the valve around the entire peripheral edge of the valve disc.

FIG. 6C shows the valve disc in a position in a transition region between positions in which the peripheral edge of the valve disc engages the resilient sealing member around the entire peripheral edge and partially-closed positions in which the peripheral edge engages the sealing member along only a portion of the peripheral edge.

FIG. 6D shows the valve disc in a partially-closed position in which only a portion of the peripheral edge of the valve disc is engaging the sealing member of the valve.

FIG. 8C shows the prior art valve seat of the valve of FIGS. 9A-9C.

DETAILED DESCRIPTION OF PREFERRED EMBODIMENTS

Figure 4A:
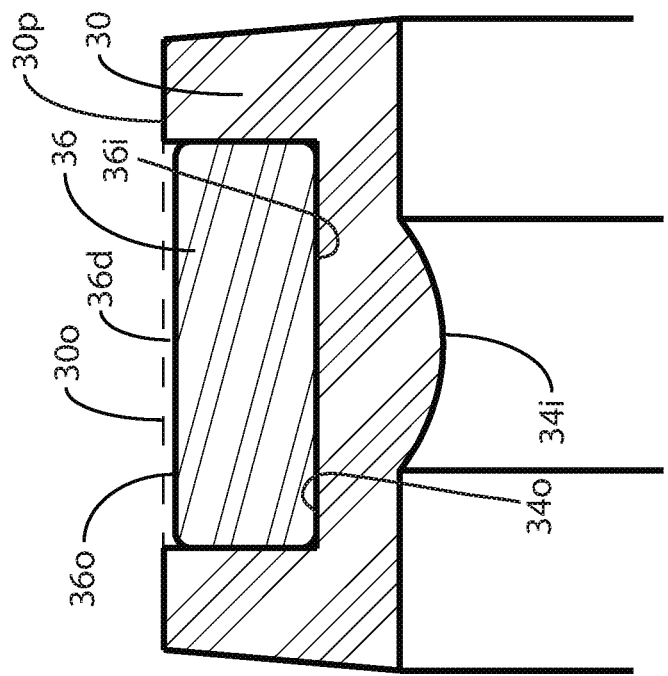
FIG. 4A is an enlarged cross-sectional view of a portion of both the resilient sealing member and the ring structure of the valve seat as indicated in FIG. 4.

As mentioned above, the specific embodiment of the inventive butterfly valve illustrated in FIGS. 1-7 and described in the following section includes a circular valve-plate which is referred to as a valve disc. Such an embodiment is not intended to limit the many possible shapes of the valve-plate and the other complementary components of the butterfly valve of this invention.

FIG. 1 is a perspective drawing of an embodiment 10 of the sanitary clean-in-place butterfly valve of this invention. Butterfly valve 10 is shown in FIG. 1 fully assembled and in a fully-closed position. FIG. 2 is an exploded perspective view of butterfly valve 10. Butterfly valve 10 includes a valve housing 12 which has two identical sections which in assembled form are clamped together by a valve clamp assembly 38. Clamp assembly 38 includes a clamp body 40 surrounding valve housing 12 and which is configured to clamp the two sections of valve housing 12 together when butterfly valve 10 is fully assembled. Clamp assembly 38 also includes a clamp fastener 42 and a clamp hinge 44 which cooperate to facilitate the closing of clamp assembly 38.

Referring now to FIG. 2A, butterfly valve 10 also includes a valve disc 14 (more generally, valve-plate 14—see above) which in valve 10 is generally circular. Valve disc 14 has a peripheral edge 16 which is located in a central plane 18 when in the fully-closed position as shown (see also FIG. 6A). A valve stem 20 is configured to rotate valve disc 14 about an axis 22 which is in central plane 18 and is centered within valve disc 14. Also shown in FIG. 2A is a plane 18$p$ which is perpendicular to central plane 18 and to axis 22. FIG. 2A also shows an intersection line 18$i$ which indicates the intersection of planes 18 and 18$p$. Perpendicular plane 18$p$ passes through the middle of valve disc 14. These two planes are also shown in FIG. 2B overlaid onto a circular resilient sealing member 26 which is described in more detail below.

The position of valve disc 14 controls flow through valve 10. (The general direction of flow through valve 10 is indicated by arrow 10$f$ in FIG. 4.) In a manually-controlled valve such as valve 10, a handle 52 is moved to set the position of valve disc 14. Handle 52 and valve stem 20 are configured to permit such position adjustment. As shown in FIGS. 2 and 2A, handle 52 engages valve stem 20, such components being assembled using a valve stem fastener 48, a valve stem washer 50 and a handle clip 54. A disc hinge pin 46 also provides support for valve disc 14 within housing 12. In other embodiments, the position of valve disc 14 in butterfly valve 10 may be adjusted by a motor or other effector which is configured to drive valve stem 20. Such effector may, for example, be powered electrically, hydraulically or pneumatically.

Butterfly valve 10 also includes a valve seat 24 which comprises (i) circular resilient sealing member 26 having a U-shaped cross-section 28 around sealing member 26 and (ii) a ring structure 36 within U-shaped cross-section 28 (see FIGS. 3 through 7 for illustrations of valve seat 24). FIGS. 3-4B and FIGS. 5A-7 are all cross-sectional views, and the plane of the cross-sections of such figures is perpendicular plane 18$p$ as illustrated in FIGS. 2A and 2B. FIG. 6A also shows intersection line 18$i$. Note that in FIGS. 3 through 7, not all reference numbers have been repeated in all of the figures in order to reduce the complexity of the numbering on some of the figures.

Referring to FIGS. 3-3B, U-shaped cross-section 28 around sealing member 26 is formed from two lateral portions 30 which extend outwardly from a cross-portion 32. Cross-portion 32 includes an inward valve-seating surface 34$i$ which is configured to engage valve-disc peripheral edge 16 to form a seal when valve disc 14 is in closed positions. Cross-portion 32 also includes an opposite outward surface 34$o$. Resilient sealing member 26 has two through-holes 56 to enable valve stem 20 to pass through valve 14 along axis 22 and be driven by valve handle 52 or other driving means as mentioned above.

FIG. 3A further illustrates the various elements of resilient sealing member 26. As illustrated in FIG. 3A, inward valve-seating surface 34$i$ extends fully across sealing member 26 in the direction of flow 10$f$ and thus includes surface area outside of the actual area which may be engaged by peripheral edge 16. Lateral portions 30 of resilient sealing member 26 have thickness as defined in FIG. 3A. FIG. 3A shows such thickness varying from a value of $T_1$ at inward valve-seating surface 34$i$ to a value of $T_2$ at an outer perimeter 30$p$ of each lateral portion 30 (i.e., the perimeter of resilient sealing member 26). Lateral portions 30 include outer-side surfaces 30$s$, and due to the variation of the thickness of lateral portions 30 from thickness $T_1$ to thickness $T_2$, outer-side surfaces 30$s$ are angled (at angle 30$a$) with respect to central plane 18.

FIG. 3B illustrates an alternative embodiment 28' of the U-shaped cross-section. Embodiment 28' includes lateral portions 30$c$ having outer-side surfaces 30$sc$ which are curved rather than straight as with outer-side surfaces 30$s$. Such curved surfaces 30$sc$ result in the thickness of lateral portions 30$c$ varying from thickness $T_{1c}$ to thickness value $T_{2c}$ as illustrated.

Figure 4:
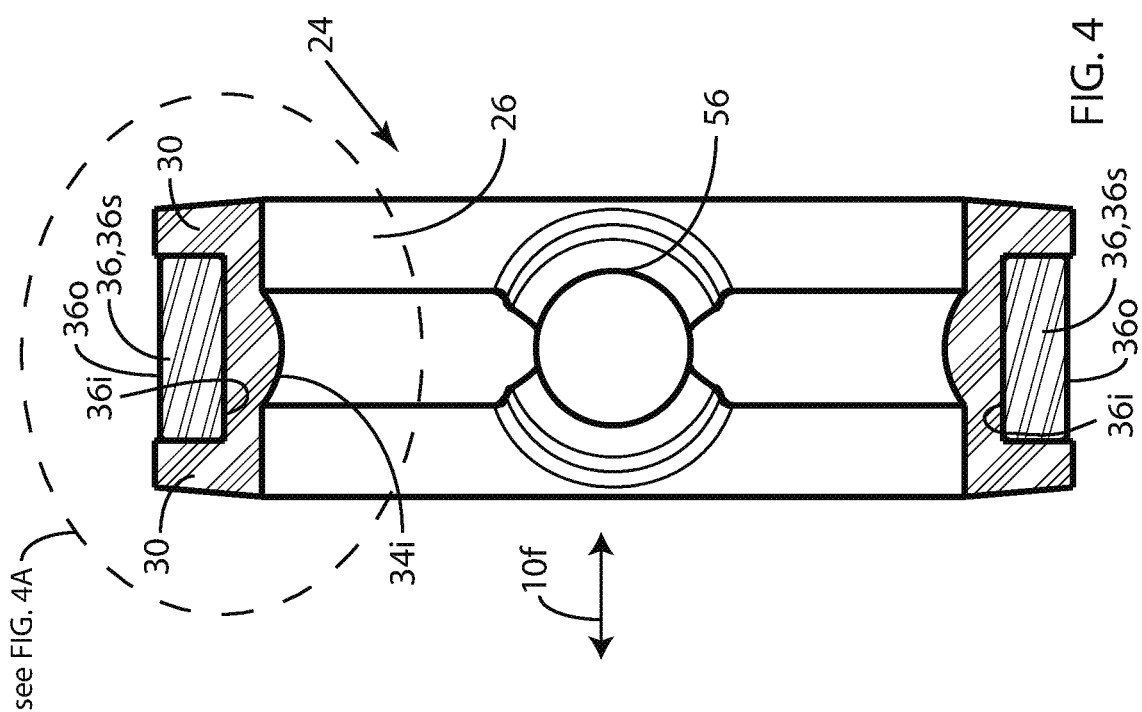
FIG. 4 is a cross-sectional view of the valve seat of the inventive butterfly valve of FIG. 1, showing both the circular resilient sealing member and the ring structure of the valve seat.
Figure 4B:
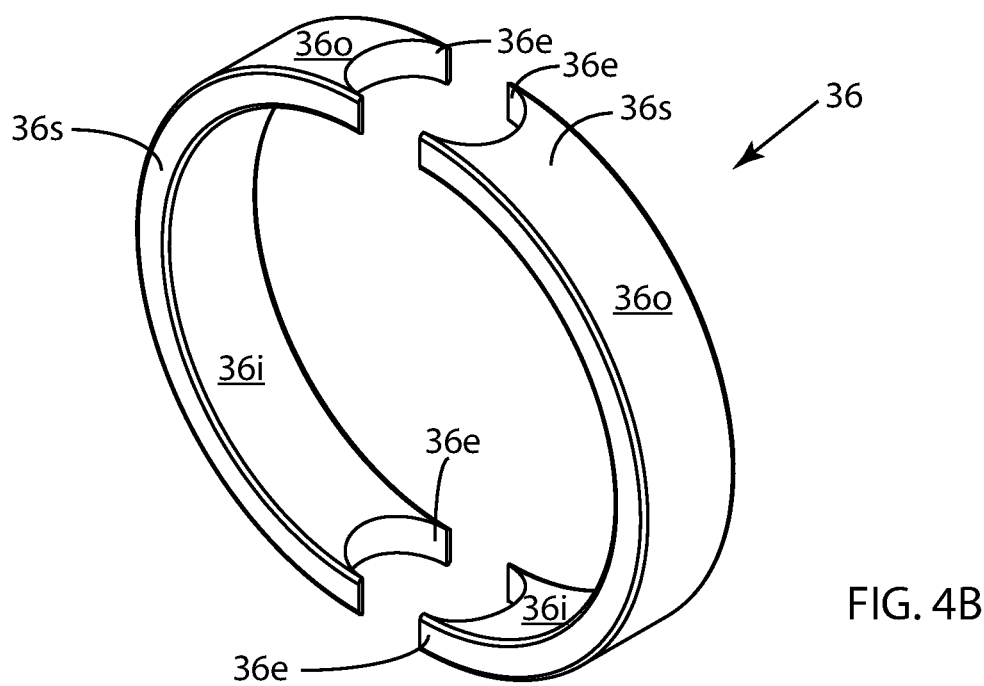
FIG. 4B is a perspective view of the ring structure of the valve seat of the butterfly valve of FIG. 1.

FIG. 4 is a cross-sectional view of valve seat 24, including resilient sealing member 26 and ring structure 36 positioned within U-shaped cross-section 28. FIG. 4A is an enlarged cross-sectional view of a portion of both resilient sealing member 26 and ring structure 36. FIG. 4B is a perspective view of ring structure 36, and FIG. 4C is a side view of ring structure 36.

Figure 4C:
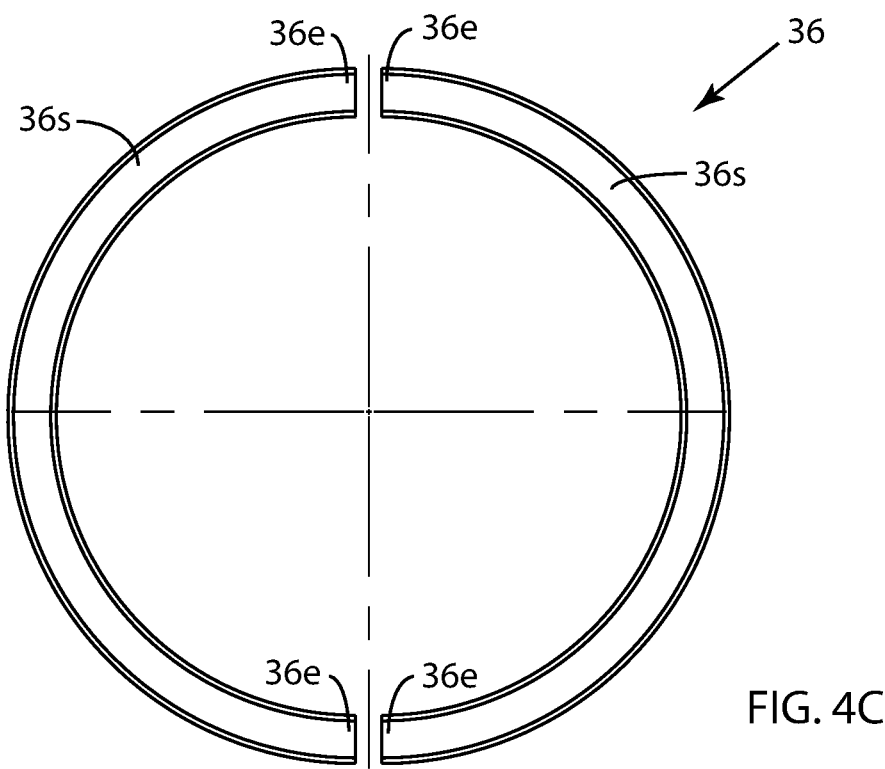
FIG. 4C is a side view of the ring structure of the valve seat of the butterfly valve of FIG. 1.

Referring to FIGS. 4-4C, ring structure 36 includes (a) an inner surface 36$i$ adjacent to the opposite outward surface 34$o$ of resilient sealing member 26 and (b) an outer surface 36$o$. Ring structure 36 is divided into two sub-ring portions 36$s$ (see FIGS. 1, 4B and 4C) and thus sub-ring portions 36$s$ each include portions of inner surface 36$i$ and outer surface 36$o$. Herein, the two portions of inner surface 36$i$ are referred to together as inner surface 36$i$, and the two portions of outer surface 36$o$ are referred to together as outer surface 36$o$. When butterfly valve 10 is assembled, the two sub-ring portions 36$s$ are adjacent to each other with ends 36$e$ adjacent to valve stem 20. Note that the gap between the sub-ring portions 36$s$ having adjacent ends 36$e$ is greatly exaggerated in FIG. 4B and less so in FIG. 4C.

Figure 5A:
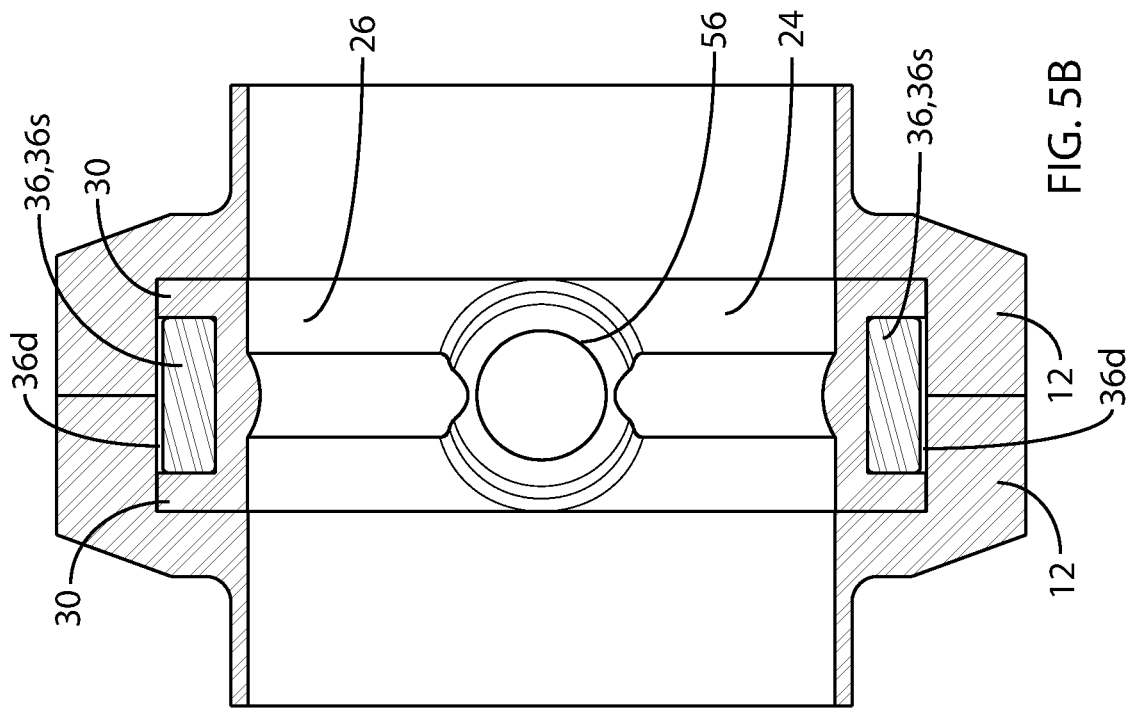
FIG. 5A is a cross-sectional view of the valve seat and valve housing of the butterfly valve of FIG. 1, showing the two halves of the valve housing not clamped together by the valve clamp assembly, thereby leaving the resilient sealing member uncompressed.
Figure 5B:
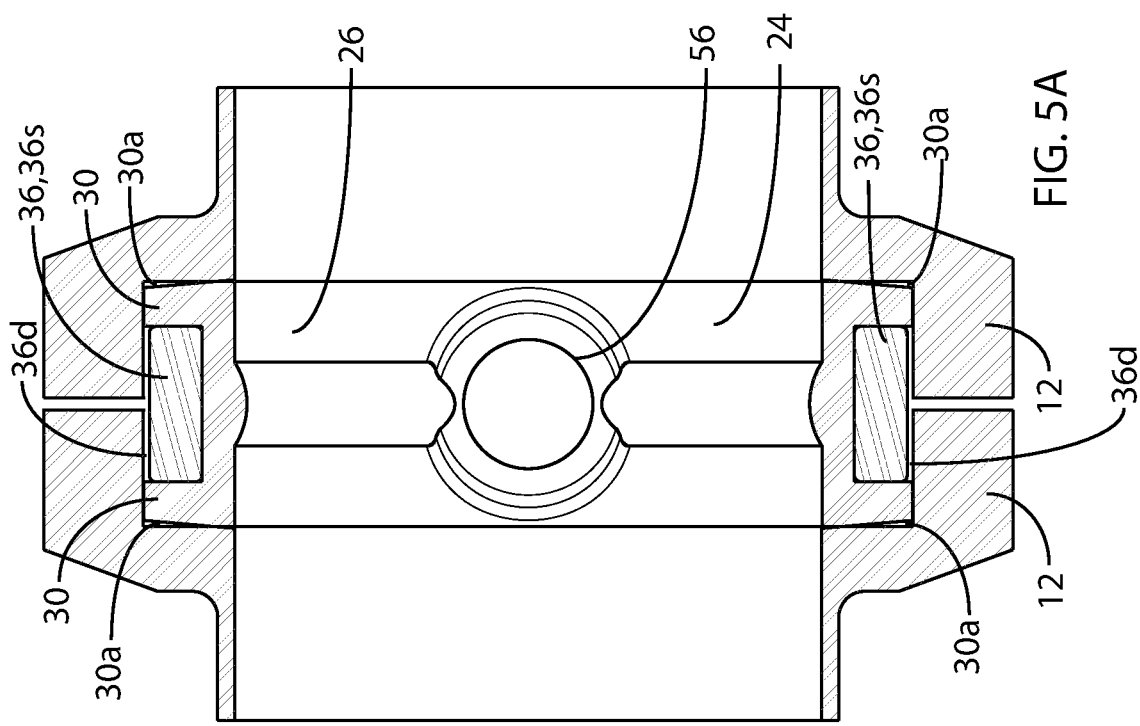
FIG. 5B is a cross-sectional view of the valve seat and valve housing of the butterfly valve of FIG. 1 showing the two halves of the valve housing clamped together by the valve clamp assembly such that the resilient sealing member is fully-compressed.
Figure 6B:
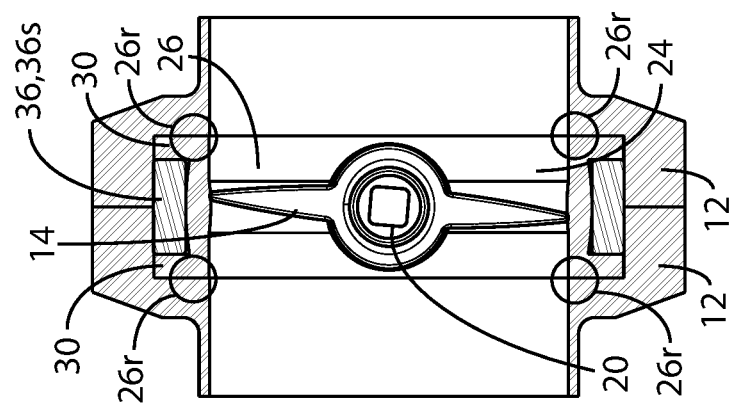
FIGS. 6A-6D are four cross-sectional views of the valve seat and valve disc in the clamped valve housing of the inventive butterfly valve of FIG. 1.
Figure 6A:
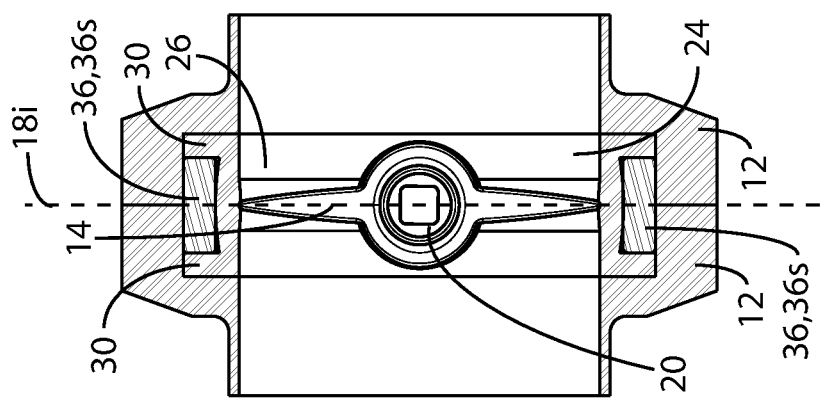
Figure 6C:
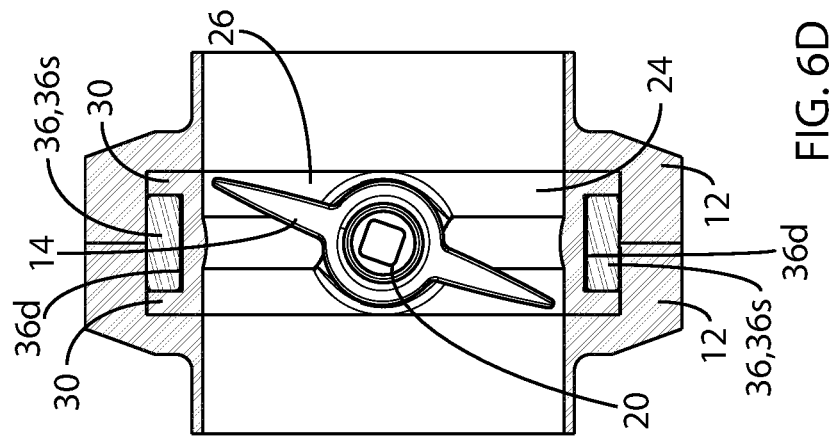
Figure 6D:
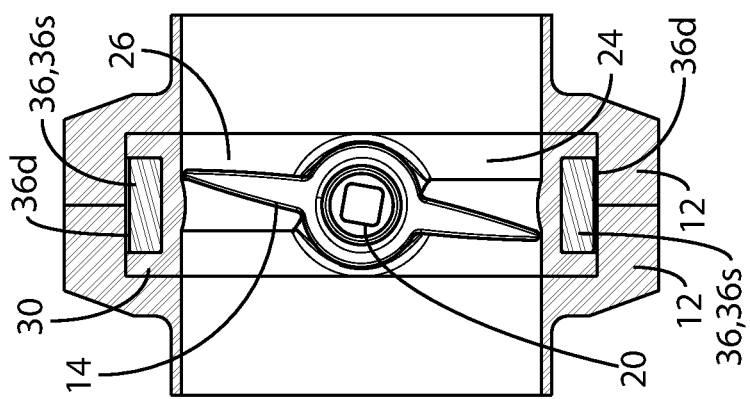
Figure 7:
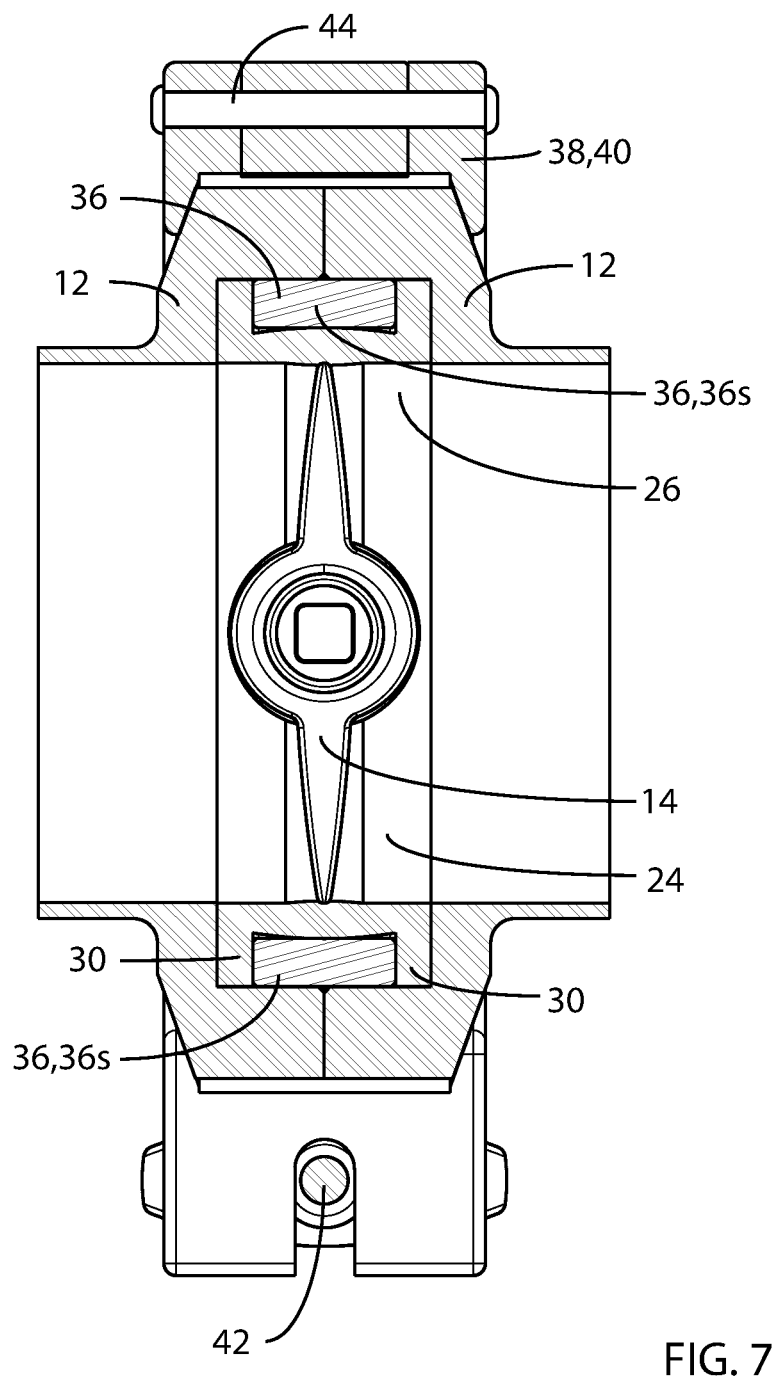
FIG. 7 is a cross-sectional view of the valve seat and valve disc in the valve housing clamped by the valve clamp assembly of the inventive butterfly valve of FIG. 1, showing the two halves of the valve housing clamped together in a fully-assembled form with the valve disc in the fully-closed position as in FIG. 6A.

Sealing member 26 is configured for sandwiching engagement by housing 12 when clamp assembly 38 is in a closed position (see FIG. 7 and also FIGS. 5B-6D). As described above, valve seat 24 also includes ring structure 36 positioned within U-shaped cross-section 28 of resilient sealing member 26. When butterfly valve 10 is clamped, sealing member 26 is compressed in direction 10$f$ parallel to flow through butterfly valve 10 as indicated in FIGS. 3A and 4.

As indicated in FIG. 4, FIG. 4A shows an enlarged cross-sectional view of a portion of both resilient sealing member 26 and ring structure 36 of valve seat 24. Of particular importance is region 36d between outer surface 36o and a dotted line labeled 30o which represents the extent of outer perimeter 30p (see FIGS. 3A and 4A) of lateral portions 30. Region 36d represents a region within which displacement of sub-ring portions 36s occurs when peripheral edge 16 of valve disc 14 compresses resilient sealing member during actuation of valve 10, thereby lowering valve actuation force. Configuration of ring structure 36 as comprising two sub-ring portions 36s also provides ease of assembly of valve 10.

FIGS. 4C and 4D provide additional illustrations of ring structure 36 of the valve seat as indicated in FIG. 4.

FIG. 4C is a perspective view of the ring structure of the valve seat of the butterfly valve of FIG. 1.

Ring structure 36 is configured to maintain the sandwiching engagement of housing 12 (see FIGS. 2, 5A and 5B) with sealing member 26 such that at all positions of valve disc 14, no crevices internal to valve 10 between housing 12 and sealing member 26 are even temporarily formed and into which debris such as fluid, particles, product residue or other contamination can be retained. (See FIG. 9C for an illustration of a prior art butterfly valve having this problematic performance.)

Valve seat 24 and valve housing 12 are configured such that the compression parallel to flow direction 10f of sealing member 26 in the clamped position is greatest along inward valve-seating surface 34i. This is achieved by ring structure 36 within U-shaped cross-section 28 of resilient sealing member 26 and the thickness variation of lateral portions 30 as described above.

Angle 30a is preferably between 3 and 8 degrees, but such an angle range is not intended to be limiting. (See also FIG. 5A in which angle 30a is illustrated at four locations.)

Resilient sealing member 26 may be made of any elastomeric material which is suitable for a specific application such as food or pharmaceutical processing. Particularly useful materials are: Kalrez®, a perfluoroelastomer from Dupont™; buna, a synthetic rubber made by polymerization or copolymerization of butadiene; Viton®, which is a fluoropolymer elastomer from Dupont™; and EPDM (ethylene propylene diene monomer) which is also a synthetic rubber. Materials for resilient sealing member 26 are not intended to be limited by this list of preferred materials.

The preferred range of the elastomeric material property of resilient sealing member 26 is between a Shore Type A durometer of 50 to 90.

FIGS. 5A through 7 illustrate various details of valve embodiment 10. FIG. 5A is a cross-sectional view of valve seat 24 and valve housing 12 of butterfly valve 10. The two halves of housing 12 are not clamped together by valve clamp assembly 38 (not shown in FIGS. 5A-6B) such that resilient sealing member 26 is uncompressed. (Note that clamp assembly 38 is only shown in FIG. 7, but in FIGS. 5B-6D, valve housing 12 is shown as being in a clamped state.) FIG. 5B is a cross-sectional view of valve seat 24 and valve housing 12 showing the two halves of valve housing 12 as these components are configured when clamped together by valve clamp assembly 38 such that resilient sealing member 26 is fully-compressed.

Because of angle 30a of lateral portions 30 as described above, as sealing member 26 is clamped, the greatest level of compression of resilient sealing member 26 occurs along inward valve-seating surface 34i. This high level of compression, based on the structure of improved valve seat 24, further contributes to preventing accumulation of debris of any kind, such as fluid, particles, product residue or other contamination, from being residually retained within valve 10 such that valve 10 is able to be cleaned-in-place, thereby avoiding dangerous process contamination and providing considerable cost-savings by eliminating a portion of the full-disassembly cleaning cycles required by many processes.

FIGS. 6A-6D and 7 provide further illustration of the clean-in-place and lower actuation force performance enabled by inventive valve 10. FIG. 6A is a cross-sectional view of valve seat 24 and valve disc 14 in valve housing 12 in the clamped configuration of FIG. 5B. Valve disc 14 is shown in the fully-closed position in FIG. 6A. FIG. 6B is an additional cross-sectional view of valve seat 24 and valve disc 14 in valve housing 12 in the clamped configuration of FIG. 5B; FIG. 6B illustrates valve disc 14 in a partially-closed position. In partially-closed positions of valve disc 14 like that shown in FIG. 6B, the shear forces applied to inward valve-seating surface 34i by disc 14 are not sufficient to overcome the compression present in resilient sealing member 26 along inward valve-seating surface 34i. Therefore, resilient sealing member 26 does not move away from housing 12 in regions 26r (four such regions also indicated by circles in FIG. 6B) at which such movement takes place in prior art valves. (See further discussion below of this movement with reference to FIGS. 8A-9C.) Of course, since valve 10 is a three-dimensional valve, regions 26r exist essentially all around valve-disc peripheral edge 16 (see FIGS. 2A and 6D) and resilient sealing member 26, not just in regions 26r as indicated in the cross-sectional view of FIG. 6B.

The partially-closed position of valve disc 14 as shown in FIG. 6B is representative of valve disc positions which may or may not be closed positions depending on the specific geometry of the valve disc and seat but which place significant shear force on inward valve-seating surface 34i and cause strain displacements within resilient sealing member 26. The significant performance of the valve of the present invention is that whatever strain occurs within resilient sealing member 26 to lower the compression along inward valve-seating surface 34i, such strain will not be enough to overcome the compression. Consequently, no space between housing 12 and resilient sealing member 26 will be opened up, thereby avoiding any accumulation of debris between housing 12 and resilient sealing member 26. Such detrimental opening up of space between housing and sealing member can occur in prior art disc valves. (See FIGS. 8A-9C and their corresponding descriptions.) With the lowered actuation forces provided by the structure of ring structure 36, the internal stresses within resilient sealing member 26 are lowered, thereby diminishing damage to resilient sealing member 26.

FIG. 6C shows valve disc 14 in a position in a transition region between positions in which peripheral edge 16 of valve disc 14 engages resilient sealing member 26 around entire peripheral edge 16 and partially-closed positions in which peripheral edge 16 engages sealing member 26 along only a portion of peripheral edge 16. FIG. 6D shows valve disc 14 in a partially-closed position in which only a portion of peripheral edge 16 of valve disc 14 is engaging sealing member 26 of valve 10.

As shown in FIGS. 4A, 5A and 5B, region 36d represents the region within which displacement of sub-ring portions 36s occurs when peripheral edge 16 of valve disc 14 compresses resilient sealing member 26 during actuation of valve 10, thereby lowering valve actuation force. Region 36d is not shown in FIGS. 6A and 6B since peripheral edge 16 of valve disc 14 is positioned such that sub-ring portions 36s are displayed outward from valve stem 20, pushing sub-ring portions 36s against valve housing 12. By comparison, FIGS. 6C and 6D show regions 36d since peripheral edge 16 of valve stem 14 is not pushing sub-ring portions 36s up against valve housing 12. Note that regions 36d in FIGS. 6C and 6D are shown in different locations, indicating that in general there is not force pushing sub-ring portions 36s inward toward valve stem 20. Thus it is possible that sub-ring portions 36s may be positioned either as shown in FIG. 6C or 6D or in other positions therebetween when peripheral edge 16 of valve stem 14 is not positioned to push sub-ring portions 36s as described above.

FIG. 7 is a cross-sectional view of valve components of FIGS. 6A-6D but also shows valve 10 clamped by valve clamp assembly 38. Valve disc 14 is in the fully-closed position in FIG. 7.

Figure 8C:
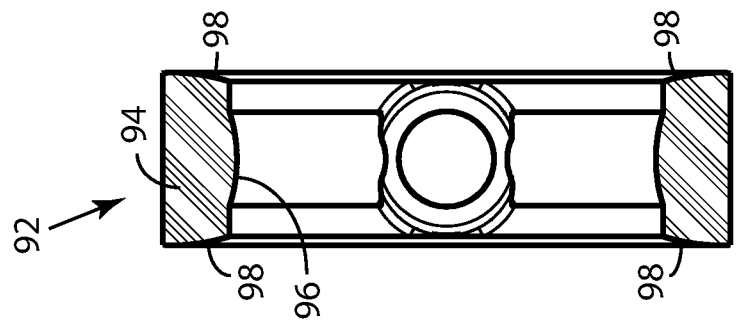
FIGS. 8A-8C illustrate a variety of prior art elastomeric valve seats, each showing just a simple cross-sectional view of the valve seat.
Figure 8B:
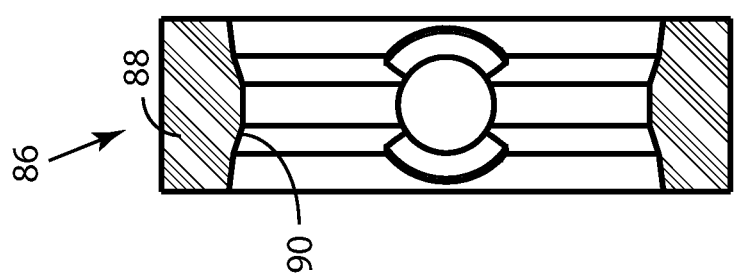
Figure 8A:
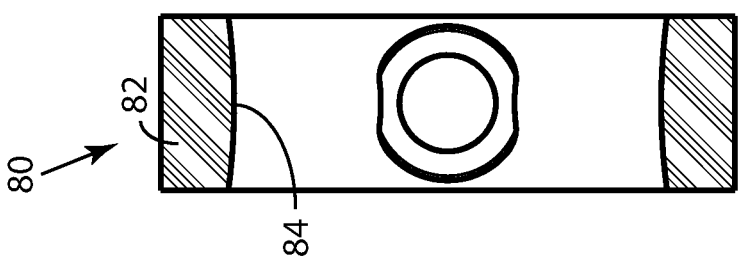

FIGS. 8A-8C illustrate a variety of prior art circular elastomeric valve seats 80, 86 and 92, each showing just a cross-sectional view of the valve seat. Prior art valve seat 80 has cross-section 82 and an inward valve-seating surface 84. Prior art valve seat 86 has cross-section 88 and an inward valve-seating surface 90. Prior art valve seat 92 has cross-section 94 and an inward valve-seating surface 96. Prior art valve seat 92 includes shaped outer side-surfaces 98.

Figure 9C:
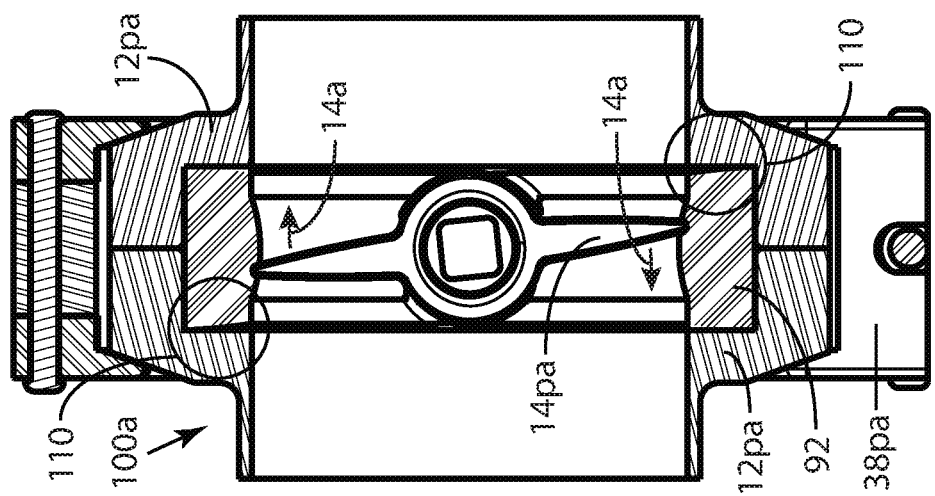
FIG. 9C is a cross-sectional view of a portion of the prior art butterfly valve of FIG. 9B (i.e., clamped) showing the valve is a partially-closed but not fully-closed position and also showing a valve clamp assembly.
Figure 9B:
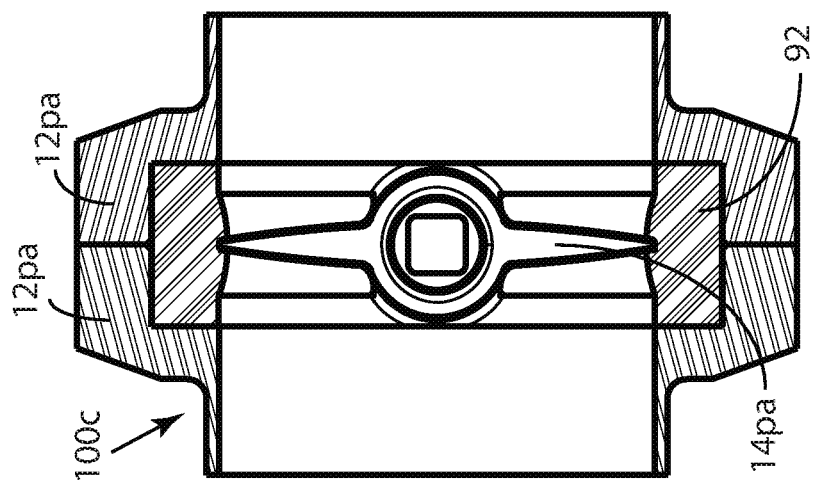
FIG. 9B is a cross-sectional view of a portion of the prior art butterfly valve of FIG. 9A, such portion being in a clamped state (without a valve clamp assembly shown) and showing the valve in the fully-closed position.
Figure 9A:
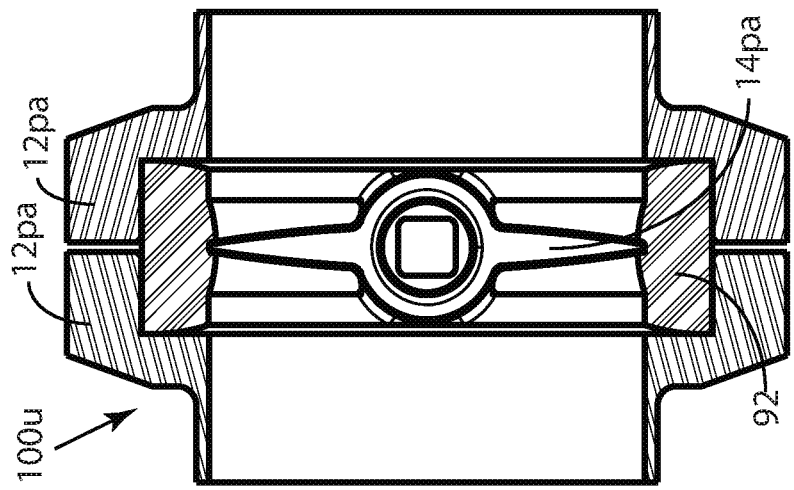
FIG. 9A is a cross-sectional view of a portion of a prior art butterfly valve, such portion being in an unclamped state similar to that shown in FIG. 5A but with the prior art valve seat of FIG. 8C. The valve disc is shown in the fully-closed position.

Prior art valve seat 92 is the valve seat illustrated in the prior art valve of FIGS. 9A-9C. The prior art valve illustrations of FIGS. 9A-9C each include prior art housings 12pa and prior art valve clamp assemblies 38pa. FIG. 9A illustrates prior art valve seat 92 in an uncompressed state within a prior art valve 100u. FIG. 9B illustrates prior art valve seat 92 in a compressed state within a prior art valve 100c. FIG. 9C illustrates prior art valve seat 92 in a compressed state within assembled prior art valve 100a. Arrow 14a indicates the direction of actuation of prior art valve disc 14pa. In such state, without the rigidity provided by a supporting structure such as ring structure 36, each of valve seats 80, 86 and 92 can move under the shear forces of valve disc 14pa movement such that a region 110 (two shown with prior art valve seat 92 in FIG. 9C) may open up and then capture and retain debris which causes contamination of a process taking place in a system in which such valve is being used. Because such accumulation may occur, full disassembly of these prior art valves may be required in order to restore the process to its required fully-clean state; cleaning-in-place is not possible with the prior art valves.

While the principles of this invention have been described in connection with specific embodiments, it should be understood clearly that these descriptions are made only by way of example and are not intended to limit the scope of the invention.

The invention claimed is:

1. In a butterfly valve having (a) a valve housing, (b) a valve-plate having a peripheral edge located in a central plane when in a fully-closed position, (c) a valve stem configured to rotate the valve-plate about an axis parallel to the central plane to control flow through the valve, and (d) a valve seat configured to engage the peripheral edge to form a seal when the valve-plate is in closed positions, the improvement wherein the valve seat comprises:
 a resilient sealing member having an inward valve-seating surface engaging the peripheral edge therearound and an opposite outward surface; and
 a ring structure, the ring structure:
  having an inner surface adjacent to the outward surface;
  having the valve stem passing therethrough along the axis;
  divided into two rigid sub-ring portions adjacent to each other with ends adjacent to the valve stem; and
  is of a size permitting relative sub-ring-portion displacement parallel to the central plane and perpendicular to the axis when the resilient sealing member is compressed during actuation, thereby lowering valve actuation force.

2. The butterfly valve of claim 1 wherein the resilient sealing member has a U-shaped cross-section therearound formed from two lateral portions extending outwardly from a cross-portion therebetween that engages the peripheral edge, the sealing member being configured for sandwiching engagement by the housing.

3. The butterfly valve of claim 2 wherein the ring structure is within the U-shaped cross-section and configured to maintain the sandwiching engagement of the housing with the sealing member, thereby to prevent accumulation of debris between the housing and sealing member.

4. The butterfly valve of claim 3 wherein the resilient sealing member is compressed in a direction substantially parallel with the direction of flow through the valve.

5. The butterfly valve of claim 4 wherein the valve seat and valve housing are configured such that the sealing-member compression is greatest along each lateral portion at the inward valve-seating surface.

6. The butterfly valve of claim 5 wherein the lateral portions of the resilient sealing member have an outer perimeter and a lateral-portion thickness, the outer-side surfaces angled such that the thickness decreases toward the outer perimeter.

7. The butterfly valve of claim 6 wherein the angle of the outer-side surfaces of the lateral portions with respect to the central plane is between 3 and 8 degrees.

8. The butterfly valve of claim 6 wherein the outer-side surfaces of the lateral portions are curved surfaces.

9. The butterfly valve of claim 1 wherein the resilient sealing member is made of a material chosen from the group consisting of Kalrez®, buna, Viton® and EPDM.

10. The butterfly valve of claim 1 wherein the resilient sealing member is made of material having a Shore Type A durometer of between 50 and 90.

11. The butterfly valve of claim 1 wherein the butterfly valve includes a handle and is manually actuated.

12. The butterfly valve of claim 1 wherein the valve-plate is circular.

13. In a butterfly valve having (a) a valve housing, (b) a valve-plate having a peripheral edge located in a central plane when in a fully-closed position, (c) a valve stem configured to rotate the valve-plate about an axis parallel to the central plane to control flow through the valve, and (d) a valve seat configured to engage the peripheral edge to form a seal when the valve-plate is in closed positions, the improvement wherein the valve seat comprises:
 a resilient sealing member having an inward valve-seating surface engaging the peripheral edge therearound and an opposite outward surface; and
 a ring structure, the ring structure:
  having an inner surface adjacent to the outward surface;
  having the valve stem passing therethrough along the axis;
  having rigid sub-ring portions at least some of which are configured to permit the valve stem to pass through the ring structure; and
  is of a size permitting relative sub-ring-portion displacement parallel to the central plane and perpendicular to the axis when the resilient sealing member is compressed during actuation, thereby lowering valve actuation force.

* * * * *